(12) United States Patent
Nakagawa et al.

(10) Patent No.: US 8,897,898 B2
(45) Date of Patent: Nov. 25, 2014

(54) ACTUATOR CONTROL SYSTEM

(75) Inventors: Shingo Nakagawa, Gifu (JP); Satoru Kojima, Gifu (JP)

(73) Assignee: NABTESCO Corporation, Tokyo (JP)

( * ) Notice: Subject to any disclaimer, the term of this patent is extended or adjusted under 35 U.S.C. 154(b) by 166 days.

(21) Appl. No.: 12/969,117

(22) Filed: Dec. 15, 2010

(65) Prior Publication Data

US 2011/0160876 A1    Jun. 30, 2011

(30) Foreign Application Priority Data

Dec. 28, 2009   (JP) .................................. 2009-297356

(51) Int. Cl.
   *G05B 11/01*   (2006.01)
   *G06F 17/00*   (2006.01)
   *B64C 13/50*   (2006.01)
   *B64C 13/42*   (2006.01)

(52) U.S. Cl.
   CPC .............. *B64C 13/503* (2013.01); *B64C 13/42* (2013.01)
   USPC .......... 700/21; 700/3; 700/9; 700/22; 700/79; 701/3

(58) Field of Classification Search
   USPC .......................................................... 700/21
   See application file for complete search history.

(56) References Cited

U.S. PATENT DOCUMENTS

| | | | | |
|---|---|---|---|---|
| 5,161,112 A | * | 11/1992 | Guerra et al. ................... | 702/58 |
| 5,170,343 A | * | 12/1992 | Matsuda ......................... | 700/79 |
| 5,274,554 A | * | 12/1993 | Takats et al. ................... | 701/29.2 |
| 5,742,624 A | * | 4/1998 | Irie et al. ....................... | 714/799 |
| 6,591,287 B1 | * | 7/2003 | More et al. ..................... | 718/102 |
| 6,718,270 B2 | * | 4/2004 | Horiuchi et al. ................ | 702/56 |
| 7,496,465 B2 | * | 2/2009 | Chirico et al. .................. | 702/117 |
| 7,827,001 B2 | * | 11/2010 | Schneider et al. .............. | 702/150 |
| 7,900,869 B2 | * | 3/2011 | Keβler et al. .............. | 244/17.13 |
| 2001/0018720 A1 | | 8/2001 | Weigl et al. | |
| 2003/0120399 A1 | | 6/2003 | Yamamoto | |
| 2008/0279685 A1 | | 11/2008 | Kessler et al. | |
| 2009/0152404 A1 | * | 6/2009 | Yount et al. ................... | 244/194 |
| 2010/0299024 A1 | * | 11/2010 | Muders et al. ................. | 701/36 |
| 2011/0066305 A1 | * | 3/2011 | Lin et al. .......................... | 701/3 |

FOREIGN PATENT DOCUMENTS

| | | |
|---|---|---|
| CN | 101512605 A | 8/2009 |
| JP | H01-247803 A | 10/1989 |
| JP | H11-268692 A | 10/1999 |
| JP | 2001-251329 A | 9/2001 |
| JP | 2003-191898 A | 7/2003 |
| JP | 2006-240612 A | 9/2006 |

OTHER PUBLICATIONS

An Office Action: "Notification of reasons for refusal," issued by the Japanese Patent Office on Sep. 18, 2013, which corresponds to Japanese Patent Application No. 2009-297356 and is related to U.S. Appl. No. 12/969,117; with translation.

(Continued)

*Primary Examiner* — Sean Shechtman
(74) *Attorney, Agent, or Firm* — Studebaker & Brackett PC (57) ABSTRACT

An apparatus includes a command generation portion that generates the command signal, and a first monitoring portion that monitors an abnormality relating to actuation of the actuator control apparatus. The actuator control apparatus includes a control portion and a second monitoring portion. The control portion generates a control signal for controlling operation of the actuator in accordance with the above-described command signal. The second monitoring portion monitors an abnormality that relates to actuation of the actuator control apparatus and that is different in type from an abnormality monitored by the first monitoring portion.

3 Claims, 3 Drawing Sheets

(56) References Cited

OTHER PUBLICATIONS

The first Office Action issued by the State Intellectual Property Office of People's Republic of China on Dec. 13, 2013, which corresponds to Chinese Patent Application No. 201010599792.0 and is related to U.S. Appl. No. 12/969,117; with English language concise explanation of the relevance.

* cited by examiner

ACTUATOR CONTROL SYSTEM

CROSS-REFERENCE TO RELATED APPLICATIONS

This application claims priority to Japanese Patent Application No. 2009-297356. The entire disclosure of Japanese Patent Application No. 2009-297356 is hereby incorporated herein by reference.

BACKGROUND OF THE INVENTION

1. Field of the Invention

The present invention relates to an actuator control system including an operation control apparatus that controls operation of a device driven by an actuator by generating a command signal for commanding operation of the device, and an actuator control apparatus that controls the actuator in accordance with the command signal.

2. Description of Related Art

Conventionally, actuator control systems including an operation control apparatus that controls operation of a device driven by an actuator by generating a command signal for commanding operation of the device, and an actuator control apparatus that controls the actuator in accordance with the command signal are known (for example, see JP 2006-240612A). JP 2006-240612A discloses an actuator control system that controls operation of a control surface (operation of a device) of an aircraft. This actuator control system includes an FCC (Flight Control Computer) serving as an operation control apparatus and an ACE (Actuator Control Electronics) serving as an actuator control apparatus. Note that the ACE is provided as an actuator control apparatus that controls a cylinder actuator, which is an actuator that drives a control surface.

The actuator control apparatus of the system disclosed in JP 2006-240612A is provided with a control portion (31) serving as a digital computing portion that generates a control signal for controlling operation of the actuator in accordance with a command signal for commanding operation of the control surface that is generated by the operation control apparatus. This actuator control apparatus is further provided with a monitoring portion (41) serving as a digital computing portion that monitors an abnormality relating to actuation of the actuator control apparatus. This monitoring portion is configured to perform the same process as the above-described control portion. This provides a configuration that enables monitoring of the occurrence of a generic failure, that is, a failure that may occur commonly among the same pieces of software or hardware. In addition, the actuator control apparatus of JP 2006-240612A is also provided with a backup control portion that is configured by an analog circuit and that generates the above-described control signal.

With the actuator control apparatus disclosed in JP 2006-240612A, a generic failure is monitored by providing the monitoring portion that performs the same process as the control portion that generates a control signal for controlling operation of the actuator. However, this actuator control apparatus requires the control portion and the monitoring portion serving as the digital computing portions performing the same processes, which leads to an increase in the number of constituting components. For this reason, it is difficult to realize further simplification and streamlining of the configuration of the actuator control system.

SUMMARY OF THE INVENTION

In view of the foregoing circumstances, it is an object of the present invention to provide an actuator control system that can monitor a generic failure and realize further simplification and streamlining of the configuration, for an actuator control system in which an actuator control apparatus controls an actuator for actuation of a device in accordance with a command of an operation control apparatus to operate the device.

According to a first feature of an actuator control system of the present invention for achieving the above-described object, an actuator control system includes an operation control apparatus that controls a device driven by an actuator by generating a command signal for commanding operation of the device, and an actuator control apparatus that controls the actuator in accordance with the command signal, wherein the operation control apparatus includes a command generation portion that generates the command signal, and a first monitoring portion that monitors an abnormality relating to actuation of the actuator control apparatus, and the actuator control apparatus includes a control portion that generates a control signal for controlling operation of the actuator in accordance with the command signal, and a second monitoring portion that monitors an abnormality that relates to actuation of the actuator control apparatus and that is different in type from an abnormality monitored by the first monitoring portion.

With this configuration, an abnormality relating to actuation of the actuator control apparatus, including the process performed by the control portion, is monitored by the first monitoring portion and the second monitoring portion, and therefore a configuration that monitors a generic failure can be achieved. Also, abnormalities relating to actuation of the actuator control apparatus are monitored by the first monitoring portion provided in the operation control apparatus and the second monitoring portion provided in the actuator control apparatus after being classified by the type of abnormality. Accordingly, the operation control apparatus can be effectively used to handle a part of the abnormality monitoring functions of the actuator control apparatus, thus reducing the abnormality monitoring functions performed within the actuator control apparatus. This can simplify the configuration of the monitoring portion included in the actuator control apparatus, thus realizing simplification and streamlining of the configuration of the actuator control system as a whole. With regard to the types of abnormalities respectively monitored (the types of monitoring targets) by the first monitoring portion and the second monitoring portion, those monitoring targets that take too long to detect an abnormality via the communication data bus between the operation control apparatus and the actuator control apparatus can be monitored by the second monitoring portion on the actuator control apparatus side. On the other hand, those monitoring targets that require a large computing load can be monitored by the first monitoring portion on the operation control apparatus side.

Accordingly, with this configuration, it is possible to monitor a generic failure and realize further simplification and streamlining of the configuration, for an actuator control system in which an actuator control apparatus controls an actuator for actuation of a device in accordance with a command of an operation control apparatus to operate the device.

According to a second feature of the actuator control system of the present invention, in the actuator control system having the first feature, the first monitoring portion monitors an abnormality relating to actuation of the control portion by performing the same process as the control portion, and comparing a result of the process with a result of the process performed by the control portion.

With this configuration, an abnormality of actuation of the control portion is monitored by the first monitoring portion on the operation control apparatus side by performing the same process as the control portion of the actuator control apparatus, and performing a filtering operation or the like in which the results of the processes are compared. Accordingly, a monitoring target that requires a large computing load such as a filtering operation can be monitored by the first monitoring portion of the operation control apparatus, making it possible to efficiently let the operation control apparatus and the actuator control apparatus to handle the abnormality monitoring functions in a distributed manner.

According to a third feature of the actuator control system of the present invention, in the actuator control system having the first feature, the second monitoring portion monitors at least one of an abnormality of a power source for supplying power for actuating the actuator, and an abnormality of a current supplied via the actuator control apparatus for actuating the actuator.

With this configuration, an abnormality of a power source for actuation of the actuators, an abnormality of a supplied current, such as overcurrent, and the like are monitored by the second monitoring portion on the actuator control apparatus side. Accordingly, those monitoring targets that take too long to detect an abnormality via the communication data bus between the operation control apparatus and the actuator control apparatus, including, for example, a power source abnormality and an abnormality such as overcurrent can be monitored by the second monitoring portion on the actuator control apparatus side.

According to a fourth feature of the actuator control system of the present invention, in the actuator control system having the first feature, the type of data processed by the first monitoring portion for monitoring an abnormality is set to be limited such that a load of a communication data bus between the operation control apparatus and the actuator control apparatus is less than or equal to a predetermined value.

With this configuration, the type of data processed by the first monitoring portion on the operation control apparatus side for abnormality monitoring is set so as to limit the load of the communication data bus between the operation control apparatus and the actuator control apparatus. Accordingly, the amount of data processed by the first monitoring portion can be optimized from the viewpoint of limiting the data to the type of data that needs to be processed on the operation control apparatus side, and therefore an increase in the load of the data bus can be suppressed. Although it is also conceivable to use a data bus capable of high-speed communication, it is possible, with the configuration of the present invention, to efficiently monitor an abnormality with a system that has been realized at a lower cost.

According to a fifth feature of the actuator control system of the present invention, in the actuator control system having the first feature, a communication protocol between the operation control apparatus and the actuator control apparatus is set such that data that is processed by the first monitoring portion for monitoring an abnormality is processed after being divided into first data that is processed in a predetermined period and second data that is processed over a period longer than the predetermined period.

With this configuration, the data processed by the first monitoring portion on the operation control apparatus side for abnormality monitoring is processed after being divided into the first data that is processed in the predetermined short period and the second data that is processed in the long period. Accordingly, those monitoring targets having high accuracy requirement for abnormality detection and thus are desired to have a reduced time for abnormality detection can be processed as the first data, and those monitoring targets having relatively low accuracy requirement for abnormality detection can be processed as the second data. Accordingly, it is not necessary to uniformly lengthen the communication period of the data bus between the operation control apparatus and the actuator control apparatus, and it is possible to perform processing in an appropriate period for each of the monitoring targets by effectively utilizing the limited communication period, thus satisfying the accuracy requirement for abnormality detection. Although it is also conceivable to use a data bus capable of high-speed communication, it is possible, with the configuration of the present invention, to efficiently monitor an abnormality with a system that has been realized at a lower cost.

According to a sixth feature of the actuator control system of the present invention, in the actuator control system having the first feature, the device is driven by a plurality of the actuators, a plurality of the operation control apparatuses and a plurality of the actuator control apparatuses are provided corresponding to the plurality of actuators, a first actuator control apparatus that is one of the plurality of actuator control apparatuses controls a first actuator that is one of the plurality of actuators in accordance with the command signal of a first operation control apparatus that is one of the plurality of operation control apparatuses, a second actuator control apparatus different from the first actuator control apparatus controls a second actuator different from the first actuator in accordance with the command signal of a second operation control apparatus different from the first operation control apparatus, the first actuator control apparatus and the second actuator control apparatus have different designs of the control portions, and, when at least one of the first monitoring portion and the second monitoring portion has detected an abnormality of the first actuator control apparatus, control of the first actuator in accordance with the control signal from the control portion of the first actuator control apparatus is stopped, and the device is driven by the second actuator control apparatus controlling the second actuator in accordance with the command signal of the second operation control apparatus.

The actuator control apparatus disclosed in JP 2006-240612A is further provided with, in addition to the control portion and the monitoring portion, a backup control portion that is configured by an analog circuit and that generates a control signal in accordance with the command signal from the operation control apparatus. Meanwhile, it is often the case that an actuator control system is provided with a plurality of actuators that drive a device, and a plurality of operation control apparatuses and a plurality of actuator control apparatuses are provided corresponding to the actuators. With this configuration, the first actuator control apparatus and the second actuator control apparatus have different designs of the control portions. The actuator control system is configured such that, when an abnormality has been detected, control of the first actuator in accordance with the control signal form the control portion of the first actuator control apparatus is stopped, and the second actuator is controlled by the second actuator control apparatus to drive the device. Accordingly, even in the case where a generic failure has occurred in the first actuator control apparatus, the second actuator control apparatus including the control portion having a different design can control the second actuator to drive the device, and thereby operation of the device is controlled. The need for a backup control portion configured by an analog circuit as disclosed in JP 2006-240612A can also be eliminated. This can achieve a further significant reduction in the number of the constituting components of the actuator control system, thus realizing further simplification and streamlining of the configuration. Furthermore, the reliability of the system can be further improved by a significantly simplified configuration. Note that, in this configuration, any one of the plurality of operation control apparatuses may be the first operation control apparatus, and any one of the plurality of actuator control apparatuses may be the first actuator control apparatus.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. The embodiment of the present invention can be widely applied as an actuator control system including an operation control apparatus that controls operation of a device driven by an actuator by generating a command signal for commanding operation of the device, and an actuator control apparatus that controls the actuator in accordance with the command signal.

Figure 1:
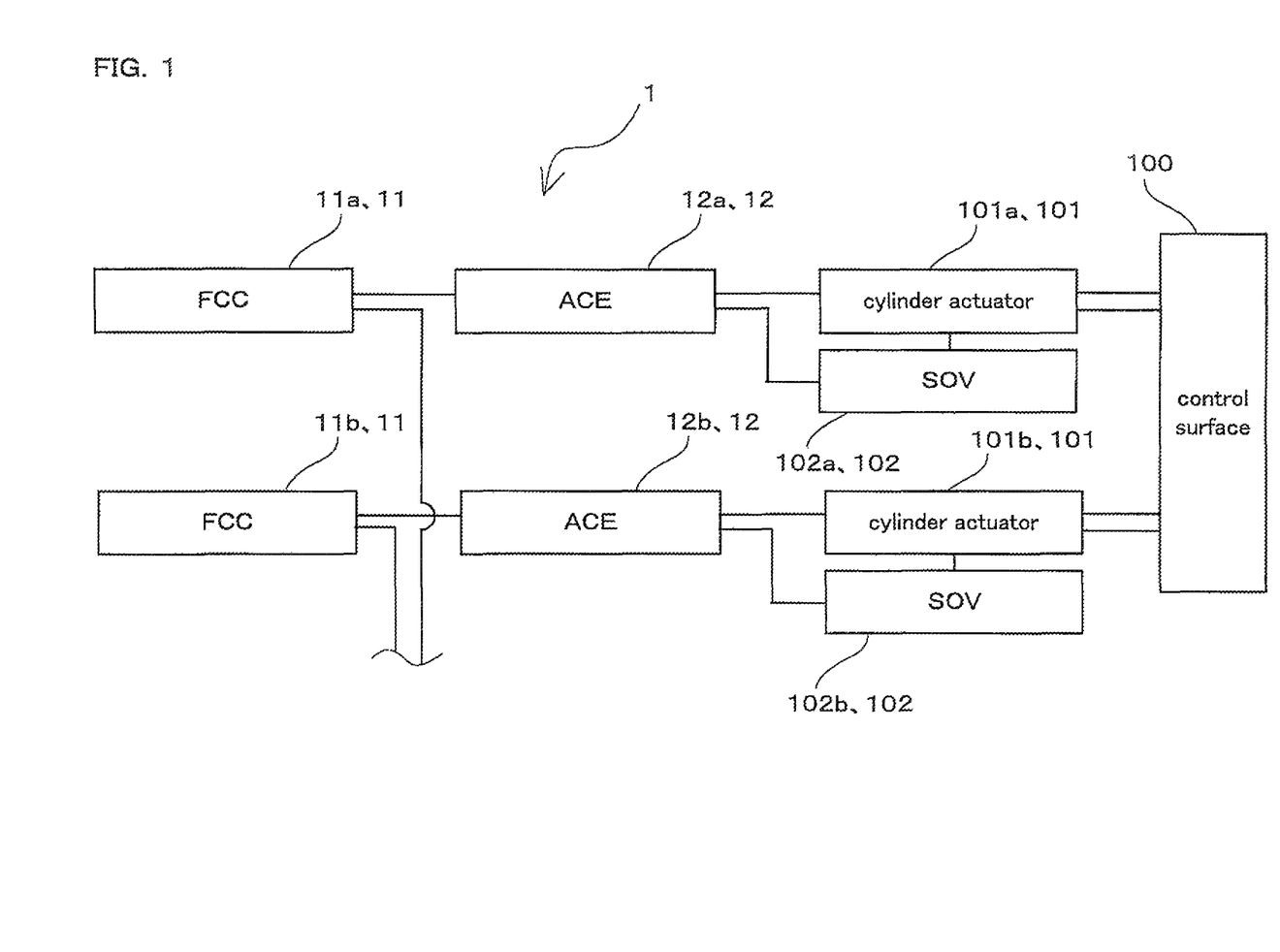
FIG. 1 is a block diagram schematically showing an actuator control system according to one embodiment of the present invention.

FIG. 1 is a block diagram schematically showing an actuator control system 1 according to one embodiment of the present invention. The actuator control system 1 shown in FIG. 1 is mounted on an aircraft (not shown), and is provided as a flight control system serving as an FBW (Fly By Wire) system that controls operation of a control surface 100 of the aircraft via electric signals.

Examples of aircraft moving surfaces (flight control surfaces) constituting the control surface 100 whose operation is controlled by the actuator control system 1 include an aileron, a rudder, and an elevator. The control surface 100 is driven by a plurality of cylinder actuators 101 (101a, 101b), and the cylinder actuators 101 are configured to operate by the control of ACEs 12 described below. The cylinder actuators 101 (101a, 101b) are also configured to follow the motion of the control surface 100 (so as to be slaved to the control surface 100) by solenoid valves (hereinafter, referred to as "SOVs") 102 (102a, 102b) being driven by the ACEs 12. The SOV 102a is provided corresponding to the cylinder actuator 101a, and the SOV 102b is provided corresponding to the cylinder actuator 101b. Note that the cylinder actuators 101 constitute actuators of this embodiment, and the control surface 100 constitutes the device of this embodiment that is driven by the actuators.

Figure 2:
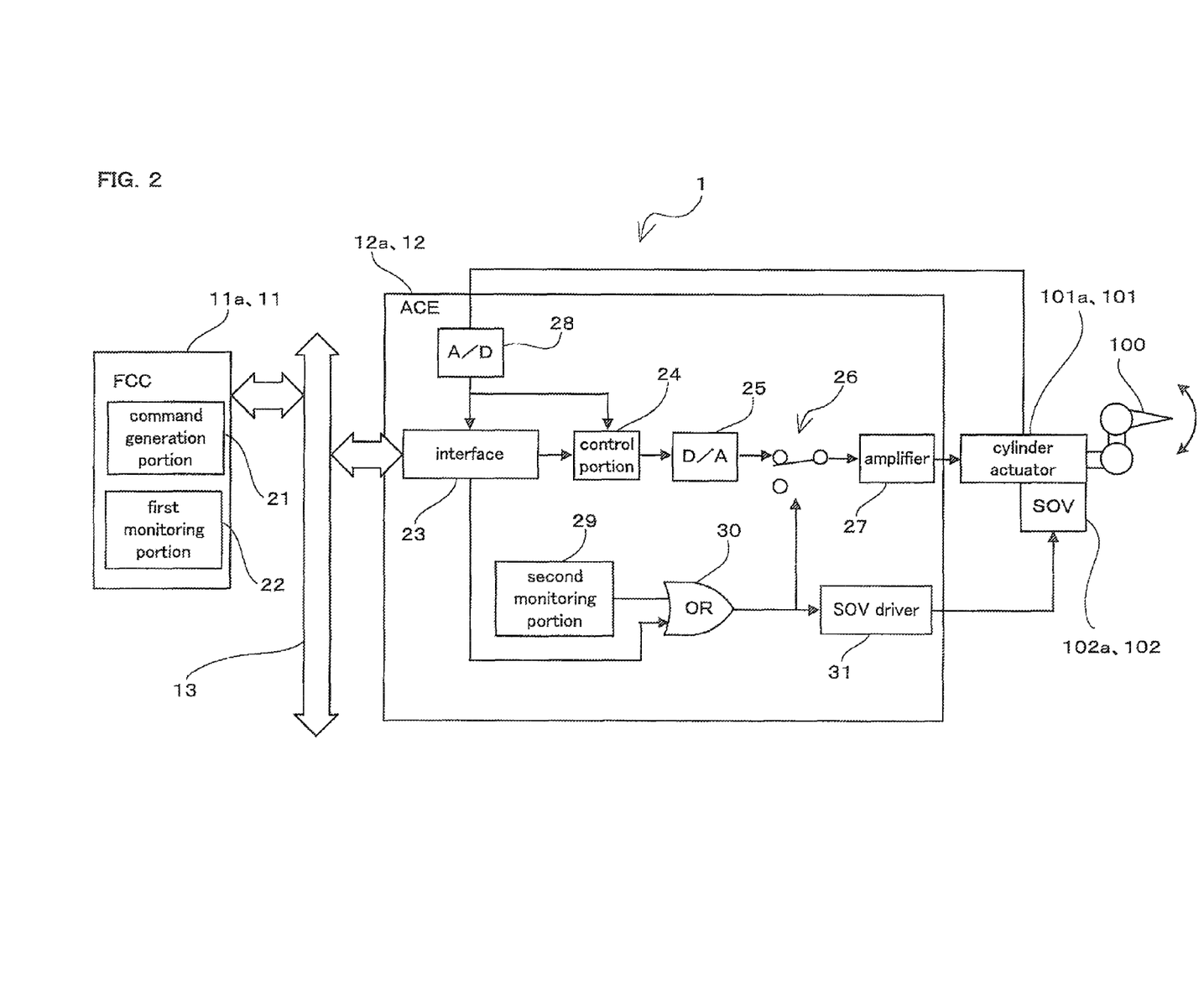
FIG. 2 is a block diagram showing the configuration of the actuator control system shown in FIG. 1 in further detail.

FIG. 2 is a block diagram showing the configuration of the actuator control system 1 in further detail. As shown in FIGS. 1 and 2, the actuator control system 1 includes a plurality of FCCs (Flight Control Computers) 11 (11a, 11b), a plurality of ACEs (Actuator Control Electronics) 12 (12a, 12b), a communication digital data bus 13 between the FCCs 11 and ACEs 12. The FCC 11a and the ACE 12a are provided corresponding to the cylinder actuator 101a, and the FCC 11b and the ACE 12b are provided corresponding to the cylinder actuator 101b.

Note that a block diagram of the FCC 11a, which is one of the plurality of FCCs 11, and the ACE 12a, which is one of the plurality of ACEs 12, is illustrated in FIG. 2, and a block diagram of the FCC 11b and the ACE 12b has been omitted from FIG. 2 since it is the same as that of the FCC 11a and the ACE 12a. In the following, the description of the FCC 11b and the ACE 12b, which are configured in the same manner as the FCC 11a and the ACE 12a, has been omitted as appropriate by describing the FCC 11a and the ACE 12a.

The FCC 11a shown in FIG. 2 is provided as an operation control apparatus of this embodiment that controls operation of the control surface 100 by generating a command signal for commanding operation of the control surface 100 in accordance with a manipulation signal or the like that is generated by the manipulation by a pilot (not shown). The FCC 11a includes a command generation portion 21 that generates the above-described command signal, and a first monitoring portion 22 that monitors an abnormality relating to actuation of the ACE 12a. The FCC 11a is configured to transmit various signals including the above-described command signal as serial data to the ACE 12a via the digital data bus 13.

The ACE 12a shown in FIG. 2 is provided as an actuator control apparatus of this embodiment that controls the cylinder actuator 101a in accordance with the command signal from the FCC 11a. The ACE 12a is installed integrally with the cylinder actuator 101a, or is installed at a place located close to the cylinder actuator 101a. Also, the ACE 12a is provided with an interface 23, a control portion 24, a D/A (digital to analog converting portion) 25, a relay 26, an amplifier 27, an A/D (analog to digital converting portion) 28, a second monitoring portion 29, an OR circuit 30, an SOV driver 31, and so forth.

The interface 23 is configured to allow a signal to be input and output to and from the FCC 11a via the digital data bus 13. The control portion 24 is configured to generate a control signal for controlling operation of the cylinder actuator 101a, in accordance with the command signal from the FCC 11a that is input via the interface 23, a feedback signal that is transmitted from the cylinder actuator 101a, and sensor signals that are input from various sensors (not shown). Note that the control portion 24 is configured, for example, by an FPGA, an ASIC, or a computer that stores software and functions according to that software. The control portion 24 of the ACE 12a and a control portion 24 (not shown) of the ACE 12b are configured to be capable of performing the same process, but are configured as control portions having designs different from one another.

A control signal that has been generated by the control portion 24 is converted from digital data to analog data in the D/A 25. Then, the control signal that has been converted into the analog data in the D/A 25 is input via the relay 26 to the amplifier 27, is then amplified in the amplifier 27, and is output to the cylinder actuator 101a. When no abnormality is detected by both the first monitoring portion 22 of the FCC 11a and a second monitoring portion 29 described below, the relay 26 is in a state of connecting the D/A 25 and the amplifier 27 as shown in FIG. 2.

The A/D 28 is configured to convert the feedback signal from the cylinder actuator 101a from analog data to digital data. The feedback signal is input to the control portion 24, and also to the first monitoring portion 22 of the FCC 11a via the interface 23. Accordingly, an abnormality that can be monitored based on data that is received via the A/D 28, the interface 23, and the digital data bus 13 can be monitored by the first monitoring portion 22 of the FCC 11a without providing special hardware, since the A/D 28 is provided.

The second monitoring portion 29 is configured to monitor an abnormality that relates to actuation of the ACE 12a and that is different in type from the abnormality monitored by the first monitoring portion 22. The second monitoring portion 29 is configured to monitor, for example, an abnormality of a power source (not shown) that supplies power for actuating the cylinder actuator 101a and an abnormality of a current (e.g., overcurrent) that is supplied via the ACE 12a to the cylinder actuator 101a for actuating the cylinder actuator 101a.

On the other hand, the first monitoring portion 22 of the FCC 11a is configured to monitor an abnormality relating to actuation of the control portion 24, for example, by performing the same process as the control portion 24 of the ACE 12a, and comparing a result of the process with a result of the process performed by the control portion 24. Note that the data on the result of the process performed by the data control portion 24 is transmitted to the FCC 11a via the interface 23 and the digital data bus 13.

The type of the data processed by the first monitoring portion 22 for monitoring an abnormality relating to actuation of the ACE 12a is set to be limited such that the load of the digital data bus 13 is less than or equal to a predetermined value, in view of the condition that the increase in the load of the digital data bus 13 is minimized.

A communication protocol between the FCC 11a and the ACE 12a is set such that the data that is processed by the first monitoring portion 22 for monitoring an abnormality relating to actuation of the ACE 12a is processed after being divided into first data that is processed in a predetermined period and second data that is processed over a period longer than the predetermined period.

Figure 3A:
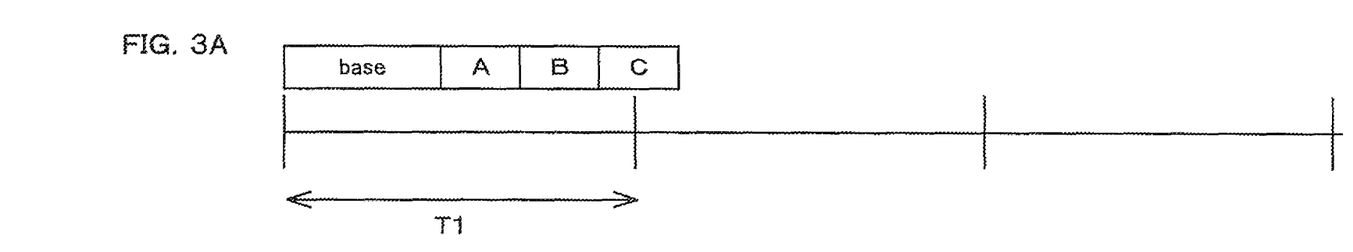
FIG. 3A is a chart schematically illustrating a communication process between an operation control apparatus and an actuator control apparatus of the actuator control system shown in FIG. 1.
Figure 3B:
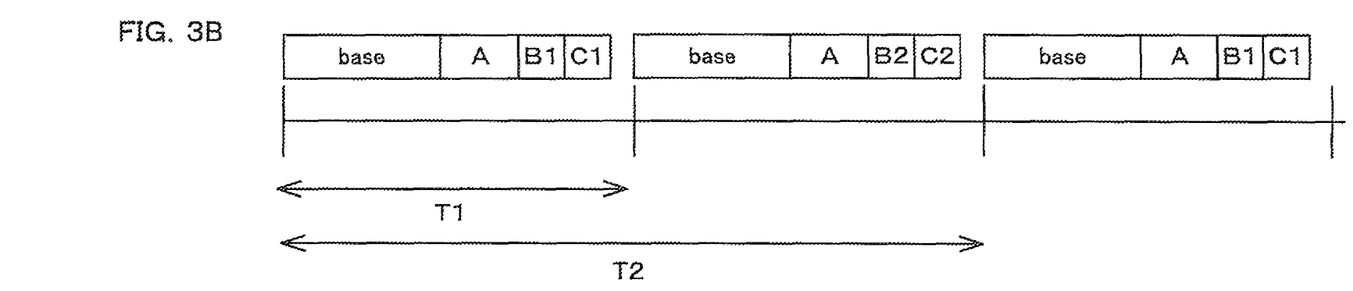
FIG. 3B is a chart schematically illustrating a communication process between an operation control apparatus and an actuator control apparatus of the actuator control system shown in FIG. 1.
Figure 3C:
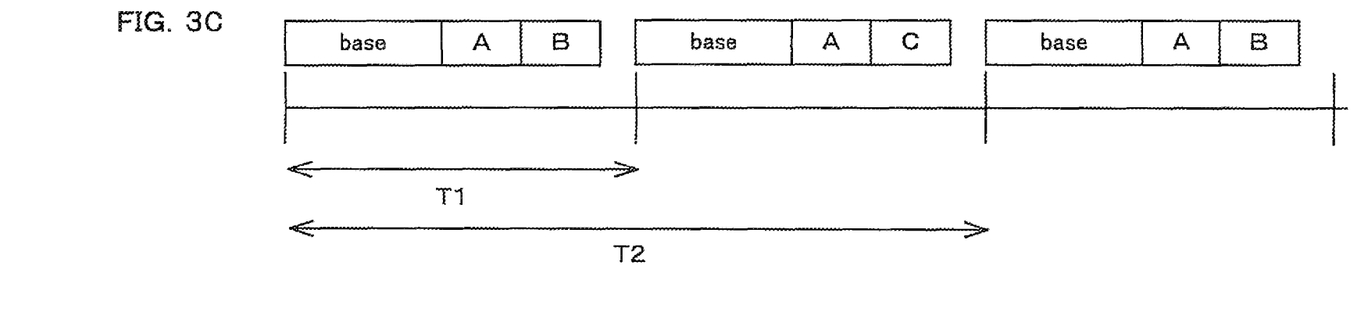
FIG. 3C is a chart schematically illustrating a communication process between an operation control apparatus and an actuator control apparatus of the actuator control system shown in FIG. 1.

FIGS. 3A to 3C are charts schematically illustrating exemplary communication processes between the FCC 11a and the ACE 12a that are performed separately for the above-described first data and second data. The description with reference to FIGS. 3A to 3C is given assuming that base data, data A, data B, and data C exist as the data that is periodically communicated via the digital data bus 13, as shown in FIG. 3A. Here, the base data is data that is not monitored by the first monitoring portion 22, but is data that is periodically communicated. On the other hand, the data A, the data B, and the data C are data that are monitored by the first monitoring portion 22. The data A is monitored with high accuracy requirement for abnormality detection and thus is desired to have a reduced time for abnormality detection, and the data B and the data C are monitored with relatively low accuracy requirement for abnormality detection.

When all of the data A, the data B, and the data C, in addition to the base data, are to be communicated in a predetermined period T1, not all of the data can be processed if the period T1 is short, as shown in FIG. 3A. If the period T1 is set longer in order to communicate all the data in a predetermined period, then the detection accuracy for the data A that is monitored with high accuracy requirement for detection will be reduced.

On the other hand, with the actuator control system 1, the communication process is performed as shown in FIG. 3B or 3C. FIGS. 3B and 3C illustrate exemplary communication processes in which the data A is set as the above-described first data that is processed in the predetermined period T1, and the data B and the data C are set as the above-described second data that are processed over the predetermined period T2 that is longer than the predetermined period T1.

In the case of the process shown in FIG. 3B, the data B that is the second data is divided into a plurality of data sets (B1, B2). Likewise, the data C that is the second data is also divided into a plurality of data sets (C1, C2). The plurality of data sets (B1, B2) resulting from dividing the data B and the plurality of data sets (C1, C2) resulting from dividing the data C are processed in the period T2, which is a period spanning a plurality of cycles of the predetermined period T1. On the other hand, in the case of the process shown in FIG. 3C, the data B and the data C are not divided. The data A that is the first data and the data B that is the second data are processed in a period T1, and the data A that is the first data and the data C that is the second data are processed in a period T1 that is different from the aforementioned period T1.

In both of the above-described communication processes shown in FIGS. 3B and 3C, the data A that is the first data is processed in the short predetermined period T1, and the data B and the data C that are the second data are processed in the long period T2. That is, the data A that is monitored with high accuracy requirement for abnormality detection can be processed in the short predetermined period T1, and the data B and the data C that are monitored with relatively low accuracy requirement for abnormality detection can be processed in the long period T2.

Here, a case will be described where an abnormality has been detected by the first monitoring portion 22 and the second monitoring portion 29. When an abnormality has been detected by the first monitoring portion 22 of the FCC 11a, a switching signal for switching the relay 26 and a slave command signal for driving the SOV 102a such that the cylinder actuator 101a is slaved to an external load (is slaved to the control surface 100) are output from the first monitoring portion 22 to the OR circuit 30 via the digital data bus 13 and the interface 23. Likewise, when an abnormality has been detected by the second monitoring portion 29 of the ACE 12a, a switching signal for switching the relay 26 and a slave command signal for driving the SOV 102a such that the cylinder actuator 101a is slaved to an external load are output from the second monitoring portion 29 to the OR circuit 30.

When a switching signal and a slave command signal are input to the OR circuit 30 from at least one of the first monitoring portion 22 and the second monitoring portion 29, the OR circuit 30 outputs the switching signal and the slave command signal. Then, the state of the relay 26 is switched from the state shown in FIG. 2 to the state where connection between the D/A 25 and the amplifier 27 is released and the control signal from the D/A 25 will not be input to the amplifier 27. Accordingly, the control of the cylinder actuator 101a in accordance with the control signal generated by the control portion 24 is stopped. Further, the slave command signal having been input from the OR circuit 30 to the SOV driver 31 causes the SOV driver 31 to drive the SOV 102a such that the cylinder actuator 101a is slaved to the control surface 100.

Next, the actuation of the actuator control system 1 will be described. In the following description, the cylinder actuator 101a, which is one of the plurality of cylinder actuators 101, is taken as a first actuator, and the cylinder actuator 101b is taken as a second actuator that is different from the first actuator. Also, the FCC 11a, which is one of the plurality of FCCs 11, is taken as a first operation control apparatus, and the FCC 11b is taken as a second operation control apparatus that is different from the first operation control apparatus. Furthermore, the ACE 12a, which is one of the plurality of ACEs 12 is taken as a first actuator control apparatus, and the ACE 12b is taken as a second actuator control apparatus that is different from the first actuator control apparatus. For the case where the cylinder actuator 101b is the first actuator, the cylinder actuator 101a is the second actuator, the FCC 11b is the first operation control apparatus, the FCC 11a is the second operation control apparatus, the ACE 12b is the first actuator control apparatus, and the ACE 12a is the second actuator control apparatus, the description is redundant and therefore has been omitted.

At the time of normal actuation in which no abnormality is detected by the first monitoring portion 22 of the FCC 11a and the second monitoring portion 29 of the ACE 12a, the ACE 12a controls the cylinder actuator 101a in accordance with the command signal from the FCC 11a, and the ACE 12b controls the cylinder actuator 101b in accordance with the command signal from the FCC 11b. Consequently, operation of the control surface 100 driven the cylinder actuator 101a and the cylinder actuator 101b is controlled.

On the other hand, when at least one of the first monitoring portion 22 of the FCC 11a and the second monitoring portion 29 of the ACE 12a has detected an abnormality of the ACE 12a, the above-described switching signal and slave command signal are output from one of the first monitoring portion 22 of the FCC 11a and the second monitoring portion 29 of the ACE 12a. Then, these signals are input to the OR circuit 30 of the ACE 12a. Consequently, in the ACE 12a, the relay 26 is switched to the state where the connection between the D/A 25 and the amplifier 27 is released, and the control of the cylinder actuator 101a in accordance with the control signal of the control portion 24 is stopped. Then, the SOV driver 31 of the ACE 12a to which the slave command signal has been input drives the SOV 102a such that the cylinder actuator 101a is slaved to the control surface 100.

In contrast, the control portion 24 of the ACE 12b is configured as a control portion having a different design from that of the control portion 24 of the ACE 12a, and therefore the same abnormality as that of the ACE 12a (an abnormality that may constitute a generic failure) will not occur. Accordingly, the control surface 100 is driven by the ACE 12b controlling the cylinder actuator 101b in accordance with the command signal of the FCC 11b, and thereby operation of the control surface 100 is controlled. At this time, the cylinder actuator 101a is slaved to the control surface 100 driven by the cylinder actuator 101b.

As described above, with the actuator control system 1, an abnormality relating to actuation of the ACE (actuator control apparatus) 12, including the process performed by the control portion 24, is monitored by the first monitoring portion 22 and the second monitoring portion 29, and therefore a configuration that monitors a generic failure can be achieved. Also, abnormalities relating to actuation of the ACE 12 are monitored by the first monitoring portion 22 provided in the FCC 11 (operation control apparatus) and the second monitoring portion 29 provided in the ACE 12 after being classified by the type of abnormality. Accordingly, the FCC 11 can be effectively used to handle a part of the abnormality monitoring functions of the ACE 12, thus reducing the abnormality monitoring functions performed within the ACE 12. This can simplify the configuration of the monitoring portion included in the ACE 12, thus realizing simplification and streamlining of the configuration of the actuator control system 1 as a whole. With regard to the types of abnormalities respectively monitored (the types of monitoring targets) by the first monitoring portion 22 and the second monitoring portion 29, those monitoring targets that take too long to detect an abnormality via the digital data bus 13 between the FCC 11 and the ACE 12 can be monitored by the second monitoring portion 29 on the ACE 12 side. On the other hand, those monitoring targets that require a large computing load can be monitored by the first monitoring portion 22 on the FCC 11 side.

Accordingly, with the actuator control system 1, it is possible to monitor a generic failure and realize further simplification and streamlining of the configuration, for an actuator control system in which an actuator control apparatus controls an actuator for actuation of a device in accordance with a command of an operation control apparatus to operate the device.

Furthermore, with the actuator control system 1, an abnormality of actuation of the control portion 24 is monitored by the first monitoring portion 22 on the FCC 11 side by performing the same process as the control portion 24 of the ACE 12, and performing a filtering operation or the like in which the results of the processes are compared. Accordingly, a monitoring target that requires a large computing load such as a filtering operation can be monitored by the first monitoring portion 22 of the FCC 11, making it possible to efficiently let the FCC 11 and the ACE 12 handle the abnormality monitoring functions in a distributed manner.

Furthermore, with the actuator control system 1, an abnormality of a power source for actuation of the cylinder actuators 101, an abnormality of a supplied current, such as overcurrent, and the like are monitored by the second monitoring portion 29 on the ACE 12 side. Accordingly, those monitoring targets that take too long to detect an abnormality via the digital data bus 13 between the FCC 11 and the ACE 12, including, for example, a power source abnormality and an abnormality such as overcurrent can be monitored by the second monitoring portion 29 on the ACE 12 side.

Furthermore, with the actuator control system 1, the type of data processed by the first monitoring portion 22 on the FCC 11 side for abnormality monitoring is set so as to limit the load of the digital data bus 13 between the FCC 11 and the ACE 12. Accordingly, the amount of data processed by the first monitoring portion 22 can be optimized from the viewpoint of limiting the data to the type of data that needs to be processed on the FCC 11 side, and therefore an increase in the load of the digital data bus 13 can be suppressed. Furthermore, compared with the case where a data bus capable of high-speed communication is used, it is possible to efficiently monitor an abnormality with a system that has been realized at a lower cost.

Furthermore, with the actuator control system 1, the data processed by the first monitoring portion 22 on the FCC 11 side for abnormality monitoring is processed after being divided into the first data that is processed in the predetermined short period T1 and the second data that is processed in the long period T2. Accordingly, those monitoring targets having high accuracy requirement for abnormality detection and thus are desired to have a reduced time for abnormality detection can be processed as the first data, and those monitoring targets having relatively low accuracy requirement for abnormality detection can be processed as the second data. Accordingly, it is not necessary to uniformly lengthen the communication period of the digital data bus 13 between the FCC 11 and the ACE 12, and it is possible to perform processing in an appropriate period for each of the monitoring targets by effectively utilizing the limited communication period, thus satisfying the accuracy requirement for abnormality detection. Furthermore, compared with the case where a data bus capable of high-speed communication is used, it is possible to efficiently monitor an abnormality with a system that has been realized at a lower cost.

Furthermore, with the actuator control system 1, the first actuator control apparatus (for example, the ACE 12a) and the second actuator control apparatus (for example, the ACE 12b) have different designs of the control portions 24. The actuator control system 1 is configured such that, when an abnormality has been detected, control of the first actuator (for example, the cylinder actuator 101a) in accordance with the control signal form the control portion 24 of the first actuator control apparatus is stopped, and the second actuator (for example, the cylinder actuator 101b) is controlled by the second actuator control apparatus to drive the control surface 100. Accordingly, even in the case where a generic failure has occurred in the first actuator control apparatus, the second actuator control apparatus including the control portion 24 having a different design can control the second actuator to drive the control surface 100, and thereby operation of the control surface 100 is controlled. The need for a backup control portion configured by an analog circuit as disclosed in JP 2006-240612A can also be eliminated. This can achieve a further significant reduction in the number of the constituting components of the actuator control system 1, thus realizing further simplification and streamlining of the configuration. Furthermore, the reliability of the system can be further improved by a significantly simplified configuration.

Although an embodiment of the present invention has been described thus far, the present invention is not limited to the above-described embodiment, and various modifications may be made within the scope recited in the claims. For example, the following modifications are possible (1) Although this embodiment was described, taking, as an example, a case where an actuator control system is provided as a flight control system that controls operation of an control surface of an aircraft, this need not be the case. The present invention may also be applied to an actuator control system other than a flight control system.

(2) The classification between the monitoring target of the first monitoring portion and the monitoring target of the second monitoring portion is not limited to that illustrated in this embodiment, and various modifications may be made.

(3) Although this embodiment was described, taking as an example, a configuration in which the actuator control apparatus is not provided with a backup control portion configured by an analog circuit, this need not be the case. That is, an actuator control system may be implemented in which an actuator control apparatus is provided with a backup control portion configured by an analog circuit.

The present invention can be widely applied as an actuator control system including an operation control apparatus that controls operation of a device driven by an actuator by generating a command signal for commanding operation of the device, and an actuator control apparatus that controls the actuator in accordance with the command signal. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. A fly-by-wire flight actuator control system comprising:
an operation control apparatus to control a device driven by an actuator by generating a command signal for commanding operation of the device, the operation control apparatus includes a command generation portion to generate the command signal for commanding operation of the device, and the operation control apparatus further includes a first monitoring portion;
a communication bus; and
an actuator control apparatus interfacing with the operation control apparatus via the communication bus to control the actuator in accordance with the command signal received from the operation control apparatus;
wherein the actuator control apparatus includes a control portion to generate a control signal for controlling operation of the actuator in accordance with the command signal received from the operation control apparatus, and a second monitoring portion to monitor an abnormality related to actuation of the actuator control apparatus, wherein the second monitoring portion is to monitor an abnormality of a different type than an abnormality monitored by the first monitoring portion,
wherein the first monitoring portion of the operation control apparatus is configured to monitor an abnormality relating to actuation of the control portion of the actuator control apparatus,
wherein the first monitoring portion monitors an abnormality relating to actuation of the control portion by performing the same process as the control portion, and comparing a result of the process with a result of the process performed by the control portion, and;
wherein the second monitoring portion monitors at least one of an abnormality of a power source for supplying power for actuating the actuator, and an abnormality of a current supplied via the actuator control apparatus for actuating the actuator.

2. The actuator control system according to claim 1, wherein a communication protocol between the operation control apparatus and the actuator control apparatus is set such that data that is processed by the first monitoring portion for monitoring an abnormality is processed after being divided into first data that is processed in a predetermined period and second data that is processed over a period longer than the predetermined period.

3. The actuator control system according to claim 1, wherein the device is driven by a plurality of the actuators, a plurality of the operation control apparatuses and a plurality of the actuator control apparatuses are provided corresponding to the plurality of actuators,
a first actuator control apparatus that is one of the plurality of actuator control apparatuses controls a first actuator that is one of the plurality of actuators in accordance with the command signal of a first operation control apparatus that is one of the plurality of operation control apparatuses,
a second actuator control apparatus different from the first actuator control apparatus controls a second actuator different from the first actuator in accordance with the command signal of a second operation control apparatus different from the first operation control apparatus,
the first actuator control apparatus and the second actuator control apparatus have different designs of the control portions, and,
when at least one of the first monitoring portion and the second monitoring portion has detected an abnormality of the first actuator control apparatus, control of the first actuator in accordance with the control signal from the control portion of the first actuator control apparatus is stopped, and the device is driven by the second actuator control apparatus controlling the second actuator in accordance with the command signal of the second operation control apparatus.

* * * * *